United States Patent [19]
Dutta

[11] Patent Number: 5,898,681
[45] Date of Patent: Apr. 27, 1999

[54] METHODS OF LOAD BALANCING AND CONTROLLING CONGESTION IN A COMBINED FREQUENCY DIVISION AND TIME DIVISION MULTIPLE ACCESS COMMUNICATION SYSTEM USING INTELLIGENT LOGIN PROCEDURES AND MOBILE TERMINAL MOVE COMMANDS

[75] Inventor: Santanu Dutta, Cedar Rapids, Iowa

[73] Assignee: AMSE Subsidiary Corporation, Reston, Va.

[21] Appl. No.: 08/724,115

[22] Filed: Sep. 30, 1996

[51] Int. Cl.[6] .............................. H04B 7/212; H04B 7/26; H04B 7/22
[52] U.S. Cl. ......................... 370/229; 370/321; 370/337; 370/347; 455/435; 455/453; 455/517; 455/67.1
[58] Field of Search ..................................... 370/229, 230, 370/231, 235, 280, 319, 321, 329, 330, 331, 337, 347, 349

[56] References Cited

U.S. PATENT DOCUMENTS

| 5,241,685 | 8/1993 | Bodin et al. | 455/436 |
| 5,301,356 | 4/1994 | Bodin et al. | 455/436 |
| 5,507,034 | 4/1996 | Bodin et al. | 455/452 |
| 5,542,093 | 7/1996 | Bodin et al. | 370/337 |
| 5,666,356 | 9/1997 | Fleming et al. | 370/328 |

*Primary Examiner*—Alpus H. Hsu
*Attorney, Agent, or Firm*—Irah H. Donner, Pepper Hamilton LLP

[57] ABSTRACT

In a time-division multiple-access TDMA communication system communication between a hub and a substantial number of mobile terminals is conducted over a plurality of channel groups. Load balancing toward a substantially uniform distribution of traffic loads among the channel groups is implemented by sharing control of the number of mobile terminals logged into each channel group between the hub and the mobile terminals. At login time, each mobile terminal selects the optimum channel group based on a channel group congestion factor broadcast on the forward TDM channel of each respective channel group. In addition, the hub has the ability to move a desired number of the mobile terminals from one to another channel group, based on information communicated in a network management service packet. The mobile terminals initiate moves based on statistical selection of mobile terminals using the communicated information.

9 Claims, 6 Drawing Sheets

METHODS OF LOAD BALANCING AND CONTROLLING CONGESTION IN A COMBINED FREQUENCY DIVISION AND TIME DIVISION MULTIPLE ACCESS COMMUNICATION SYSTEM USING INTELLIGENT LOGIN PROCEDURES AND MOBILE TERMINAL MOVE COMMANDS

CROSS REFERENCE TO RELATED APPLICATIONS

This application is related in its disclosure to the subject matter disclosed in the following applications, all by S. Dutta, all assigned to the assignee of this application, and filed on even date herewith:

U.S. application Ser. No. 08/724,120, filed Sep. 30, 1996 entitled "Methods of Communicating over Time-Division Multiple-Access (TDMA) Communication Systems with Distinct Non-Time-Critical and Time-Critical Network Management Information Transmission Rates"; and U.S. application Ser. No. 08/724,116, filed Sep. 30, 1996 entitled "Methods of Dynamically Switching Return Channel Transmissions of Time-Division Multiple-Access (TDMA) Communication Systems between Signalling Burst Transmissions and Message Transmissions".

BACKGROUND OF THE INVENTION

This invention relates generally to message store-and-forward communication systems and particularly to time division multiple access (TDMA) communication systems, such as satellite-linked systems, which further operate with more than a single channel group.

Though not limited thereto, the invention is particularly useful as an improvement of a communication system in which a central station referred to as a "land earth station" (LES) or a "hub" communicates via satellite with a number of "mobile terminals" over a forward channel of a designated channel group, and the mobile terminals communicate with the hub over respective return channels of the channel group. The term "mobile terminal" is used herein to refer to one of a group of individual terminals that are communicating with the hub. The term "mobile terminal", as used herein, refers to the characteristic of terminals being subject to physical movement within a reception region of the system.

State of the art communication systems, as those referred to herein, generally operate over satellite links. Communication satellites covering, for example, North America relay messages over a number of area-specific spot beams which, in total, may cover the entire Continent. In such environment, the communcation system may operate in any particular spot beam with one primary time-division multiplex (TDM) forward channel, and one or more secondary TDM forward channels, wherein each TDM forward channel may carry the forward channel communication to a portion of all mobile terminals logged into the system. Each TDM channel operates with a designated number of associated return channels to make up a distinct channel group in such a multiple channel-group system.

In a specific example with respect to which the invention is described, the central station or LES operates a communication system which serves a number of individual customers, for example a number of trucking companies, each of which may operate and require control over hundreds or even in excess of a thousand trucks. The mobile terminals are installed on respective trucks of the customer trucking companies, for "star type", point-to-multipoint, communications between respective truck dispatch centers and enroute trucks of each of the trucking companies.

Satellite communication links are a limited and costly commodity. There is always a need to improve efficiency of communications over satellite communication links to lower the cost of communication systems using such satellite links. For cost reasons, the channel groups of the system are typically limited in number to match the network with anticipated load levels, although, allowing some safety margin. However, owing to variations in message traffic levels, the network can get overloaded through exhaustion of available channel capacity, or even through operational failure of the LES caused by temporary peak overload conditions.

In general, prior art LES operations seek to balance communication loads by distributing login assignments of existing mobile terminals substantially evenly over available channel groups controlled by the LES. Primary login frequencies, one per spot beam, are pre-programmed into each of the mobile terminals. The primary login frequencies are assigned and preprogrammed into each mobile terminal when it is placed into service.

Message traffic loads do not always correspond to the number of terminals assigned to operate over particular channel groups of the network. A truck may require little or no communication while on one route, and may require a substantial amount of communication while on another route. Congestion over a channel group may be caused by a single, relatively long message.

According to current practice, an LES may reserve, on demand, special "LES TDMs" or special forward channels for communicating such longer messages to the particular recipient mobile terminal, requiring such recipient mobile terminal, which is already logged in on its primary TDM channel frequency, to change its frequency the LES TDM for the receipt of the message, and, subsequently, to return to the preassigned primary TDM forward channel. While the use of on-demand, or demand-assigned, TDM channels can reduce forward traffic loads on the primary TDM channel, it does not mitigate traffic in the return direction, which is carried by a fixed set of return channels. Further, requiring the mobile terminals to change the frequency to and from the "LES TDM" adds to message transport delays and is, for that reason, undesirable.

Also, according to current practices, when a particular channel group in a spot beam becomes overloaded, an operator can prevent additional mobile terminals from logging into the channel group by setting a flag or bit in a broadcast bulletin board which acts as a busy signal. Mobile terminals, which are assigned the particular, busy channel group as a primary channel group, will be prevented from logging into the prior art communication system as long as the flag remains set. The prior art terminals are programmed to periodically check whether the busy flag has been reset, and if so, to log in at such time.

An LES, pursuant to other known practices for avoiding temporary, potentially harmful network overload conditions, may also assign a mobile terminal to a secondary channel group when the mobile terminal attempts to first log into a preassigned primary TDM channel. Assignments of mobile terminals at the time of login are made to maintain a distribution of channel loads when several channel groups are available whithin any given spot beam area. The assignments do not affect mobile terminals which are already communicating over the channel group of the primary TDM channel. An assignment of a mobile terminal to a secondary TDM channel and its associated return channels is permanent for the duration of the login period of the mobile terminal. Reassignment of a mobile terminal on initial login, as desirable as it may seem, has been found not to be able to cope whith unexpected traffic growth from the mobile terminals already logged into a channel group. Moreover, a procedure, which simply blocks further mobile terminals from logging into a particular channel group, fails to address the essence of the problem in that such procedure does not support the attainment of a substantially uniform distribution of traffic across a number of available channel groups.

Risks of communication problems due to imbalances of traffic loads among available channel groups continues to exist in current systems. There is a continued need to arrive at more economical procedures for balancing channel loads and to avoid sudden, temporary traffic congestion and overload conditions in certain channel groups and possible system failures as a result thereof.

SUMMARY OF THE INVENTION

The present invention consequently seeks to provide methods of balancing loads on TDM channels and on respective channel groups with respect to other available TDM channels and channel groups.

The invention further seeks to balance channel loads based on comparative load conditions over time.

The invention also seeks to minimize transmission time consuming handshaking communication between an LES as a central station and various mobile terminals, as may occur during initial login coupled with reassignment procedures for such mobile terminals.

The invention seeks to distribute login control away from a purely central (LES) control to an environment in which mobile terminals, as opposed to the LES, choose preferred, of, in comparison to a first, overloaded channel group, Dow-load channel groups for logins.

In this regard, the invention seeks to provide, in each spot beam of coverage, a plurality of autonomous channel groups, comprising one primary and several secondary channel groups, and to provide methods of redistributing the use of the channel groups by mobile terminals, when warranted by excess traffic in one of the channel groups.

The invention also seeks to establish an environment in which mobile terminals may make intelligent choices of whether to log into their respective primary TDM channel or whether to log into another available secondary TDM channel.

The invention additionally seeks to provide a command procedure whereby an LES, or central station, issues a single generic move command to a group of a projected number of yet unidentified ones of currently logged in terminals to move from one channel group to another.

The invention seeks in that respect to randomly spread any required move-connected logout and login communications over a time period to avoid potential channel congestion resulting from the move operation.

Accordingly, the invention is an improved method of communicating between a central station or hub referred to as "land earth station" (LES), which may include a network management station, and any mobile terminals of a first plurality of mobile terminals over a selected channel group of a second plurality of channel groups. Each channel group has one TDM channel for forward channel transmissions from the LES, which are directed toward any of the first plurality of mobile terminals. Each channel group also includes at least one, and generally more than one, return channel for TDMA return channel transmissions by any of the first plurality of mobile terminals, which are logged into the respective channel group, or, which are seeking to log into the channel group. The improvement pertains to balancing transmission loads among said channel groups. The improvement includes transmitting channel group load balancing information over the TDM channel of a first channel group of the second plurality of channel groups for reception by a first category of mobile terminals of the first plurality of mobile terminals. Mobile terminals of the first category receive said channel group load balancing information by being tuned to the TDM channel of the first channel group in preparation for, and prior to, logging into said first channel group. Channel group load balancing information is also transmitted over the TDM channel of said first channel group of the second plurality of channel groups, to be received by a second category of mobile terminals of the first plurality of mobile terminals. Mobile terminals of the second category receive said channel load balancing information while being logged into said first channel group at the time of transmission of said channel group load balancing information. Terminals of any one of the first and second categories of mobile terminals, after having received the channel group load balancing information, also interpret such channel group load balancing information. If an outcome of interpretation, of said channel group load balancing information, establishes that a second channel group, of the second plurality of channel groups, is a preferred, relatively low-load channel group to balance traffic loads among the channel groups, then at least one mobile terminal, of any of the terminals having interpreted such channel group load balancing information, is logged into the second channel group.

Other features and advantages will become apparent from the detailed description set forth below.

The detailed description of a preferred embodiment of the invention may be best understood when it is read in reference to the appended drawing in which.

DETAILED DESCRIPTION

1. General Considerations Pertaining to the Preferred Embodiment.

Figure 1:
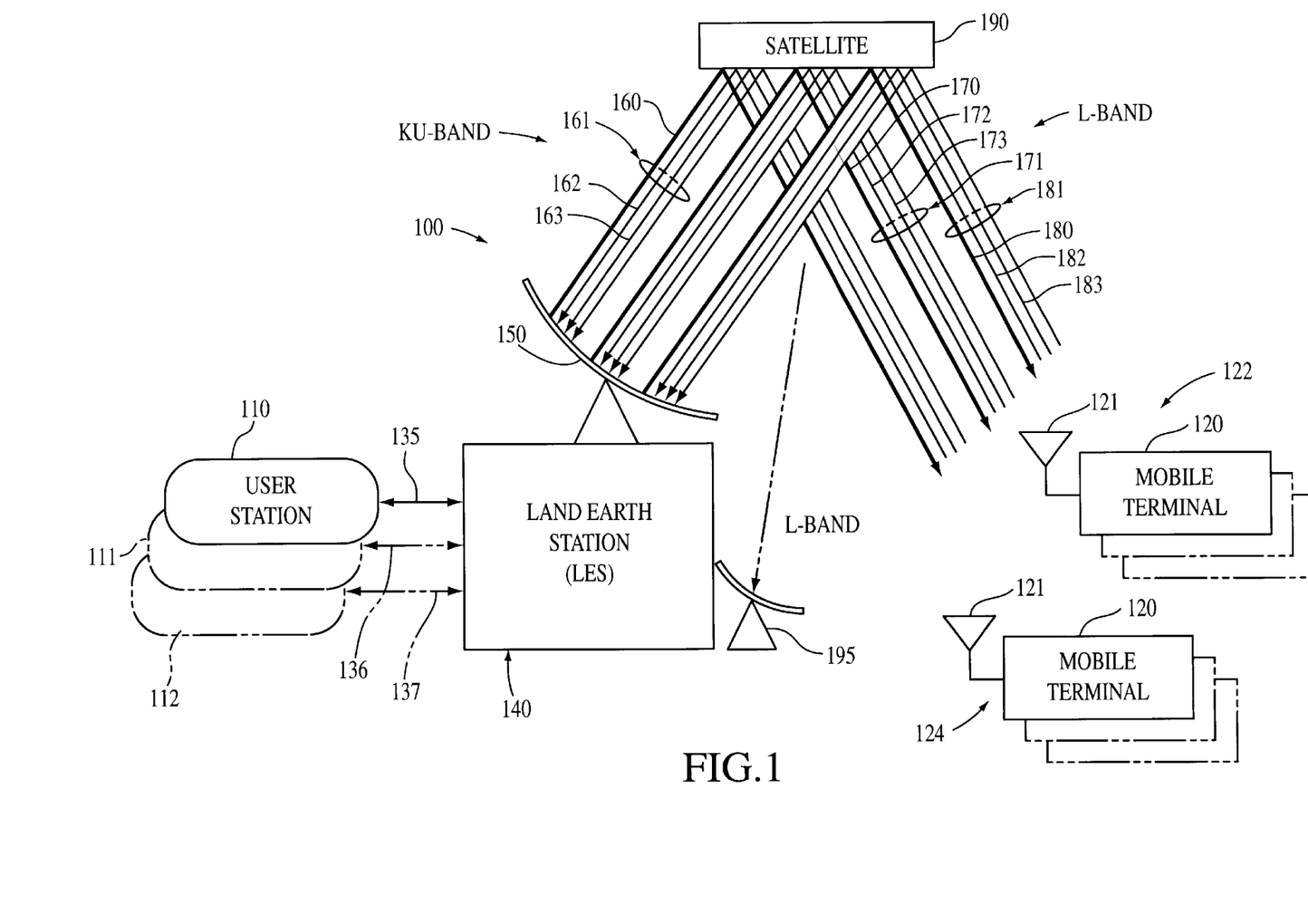
FIG. 1 is a simplified schematic representation of a time division multiple access message communication system which operates pursuant to the present invention, showing particularly a plurality of channel groups, each having a TDM channel and an associated number of return channels.

In reference to FIG. 1, a communication system, designated generally by the numeral 100, provides a communication link between each of a number of user stations, representatively numbered 110, 111, 112, and a plurality of mobile terminals, which are designated by the numeral 120. The mobile terminals 120 are RF terminals with respective antennas 121 for transmitting and receiving messages communicated by the communication system 100. The schematically simplified illustration of the communication system 100 shows a grouping or categorization of the plurality of mobile terminals 120 into first and second groups or categories, which are respectively numbered 122 and 124. The first category 122 is, as used herein, a subset of the plurality of the mobile terminals 120, the mobile terminals 120 of which are programmed, on becoming active, to log into a particular channel group, as further described below, but which currently have not completed such login. The second category 124 is a second category of the plurality of the mobile terminals 120, the mobile terminals of which are currently logged into such particular channel group of the communication system 100.

In the communication system 100, each respective user station 110, 111, 112 is coupled, in the preferred embodiment described herein, over a one of respective fixed links 135, 136, 137 to a network management station 140, herein also referred to as a "Land Earth Station" or LES 140. The LES is a communication center 140, or hub 140, which directs all communications between each of the user stations 110, 111 and 112 and any number of the mobile terminals 120.

The LES 140 communicates with each mobile terminal 120, upon such terminal logging into the system 100, by transmitting time division multiplexed information via a transmit-receive dish antenna 150 over a TDM or forward channel 160 of a respective channel group 161 into which the mobile terminals 120 may already have logged, or are in the process of logging in. The channel group 161 includes, in addition to the forward channel or TDM channel 160, an assigned number of return channels 162, 163, etc, the number of associated return channels being one of choice, depending on satellite power and bandwith and system needs. Each return channel of the group, referring generically to return channel 162 is, by frequency division, separate from any other return channel of the communication system 100, operating within its distinct frequency band. Depending on the amount of traffic the LES 140 is contemplated to handle, the communication system 100 includes, for purposes of the invention, at least two channel groups. An upper limit to the number of channel groups of the system 100 would be set by the availability of power and bandwidth on any given satellite relay station. Of course, the upper limit of such channel groups would also be chosen to relate to an expected message load or level of communications traffic to be accommodated bidirectionally between the user stations, such as the stations 110, 111, and 112, and by correspondingly associated ones of the mobile terminals 120.

Operating costs of the channels in any such channel group seem to dictate that ea& channel be operated at a maximum traffic load. However, loading channels beyond certain traffic levels is not feasible from an operational standpoint. As a practical matter, the channels of any channel group are used optimally when normal variations in expected message traffic level within the channel group does not reach levels, at which the information transmission capacities of the respective channels become exhausted.

The communication system 100 shown in FIG. I features, for illustrative purposes, a representative number of three channel groups. In addition to the already introduced channel group 161, FIG. 1 shows a second TDM channel 170 of a second channel group 171 which has second return channels 172, 173, etc., associated therewith, and a third or further TDM channel 180 of a third or further channel group 181 having third or further return channels 182, 183, etc., associated therewith. It should be noted that in each of the representative, in-use channel groups 161, 171 and 181 the number of active or in-use return channels, referred to representatively as return channels 162, 172 and 182 may vary, depending on anticipated levels of "time division multiple access" (TDMA) return traffic from the various mobile terminals 120 which are logged into a respective one of the channel groups 161, 171 and 181.

FIG. 1 further shows each of the channel groups 161, 171 and 181 as being relayed by a satellite 190. As established in the art, channel frequencies linking the LES 140 and the satellite 190, referred to as back haul link frequencies, are assigned to an RF band (typically Ku-band) dedicated to "fixed satellited services" (FSS). Frequencies of the channels communicating between the satellite 190 and the mobile terminals 120 are assigned to what is referred to as (MSS) "mobile satellite services" frequency band; a preferred MSS band is the L-band. Transmissions from the satellite toward the mobile terminals 120 on the L-band are used advantageously by the LES to measure signal strengths and signal transmission delays. The LES has for that purpose a secondary antenna 195 solely for receiving L-band transmissions from the satellite 190 for closed-loop control of uplink transmit power, automatic frequency control and time synchronization for signal demodulation at the LES 140.

The operation of the communication system 100 has to accommodate communications between the network management station or LES 140 and any number of the mobile terminals 120. The exact number of currently active mobile terminals 120 would depend, for example, on the number of trucks that are in operation at any particular time. At times, there could be in excess off 10,000 mobile terminals logged into a channel group of the system 100. Depending on the availability of additional channel groups, or based on low usage levels of currently in-use channel groups, operators at the LES 140 may add to, or delete from, in-use channel groups of the communication system 100. During normal operations of the communication system 100, there will be a substantial number of the mobile terminals 120 of the second catergory 124 of mobile terminals 120 which are already logged into any one of a second plurality of in-use channel groups, as illustrated by the channel groups 161, 171 and 181 in FIG. 1.

With respect to the communication system 100, as schematically illustrated in FIG. 1, a simplification is also to be noted, as follows. Those skilled in the art will understand that according to current satellite technology, a continent-wide distribution of the mobile terminals 120 which are serviced by a satellite-relayed link may use a plurality of "spot beams". Such spot beams are used by the satellite 190 to focus transmission and reception of RF signals. Each one of the spot beams supports many channels of selected frequencies within the above-mentioned Ku- and L-bands. Each spot beam is focused on a different region of the continent, such that all of the spot beams of directed communication channels would cover the entire continent or the desired functional range of the satellite. It should be appreciated, that the simplified schematic diagram of FIG. 1 illustrates a second plurality of channel groups 161, 171 and 181 which are, for purposes of illustration and the description herein, preferably located within a single spot beam region.

It is further understood from the above, that the communication system 100, in its entirety, is expected to include further channel groups (for simplification not illustrated), including those which at the LES-side of the link are also directed toward the antenna 150 of the LES 140, but are directed by the satellite 190 toward other spot beams of focused transmit-receive regions. When a mobile terminal "roams" from one such spot beam, or reception area, to another, such roaming is known to involve channel changes and "hand-offs" based on loss of reception quality in one spot beam region due to "physical repositioning" of the mobile terminal from one spot beam region to another. Unless expressly indicated to the contrary, the terms "move" or "movement" as used herein do not denote such "physical repositioning" of a mobile terminal in the sense of what is known as "roaming", but, instead, refers to a functional transfer of communication, i.e., switching, or retuning, of transmission and reception of signals from one channel group to another.

Past experience gathered from operating a communication system, such as the communication system 100 in FIG. 1, has shown that there appears to be no precise correlation between the number of mobile terminals 120 of the second category 124, which are currently logged into any one channel group of the channel groups 161, 171 and 181 and the traffic load on such one channel group relative to other channel groups and their respective number of logged-in mobile terminals 120.

Temporary imbalances in message traffic among the in-use channel groups 161, 171 and 181 will inevitably occur in the communication system 100. Normal, short-term message volume swings are expected to be controlled in the course of routine "store-and-forward" operations of the communication system 100, as long as the communication system continues to operate within normal traffic load ranges for both the TDM channel and the corresponding return channels of each in-use channel group. Practical experience indicates that the forward or TDM channel may be utilized or loaded to a typical maximum of 70% of a theoretical bit transmission rate. Maximum traffic loads, or utilizations, of the return channels depend on whether the loading is of the type known as "signalling" or of the type known as "messaging".

The term "messaging" pertains to the transmission of messages by any designated one of the mobile terminals 120 in a continuous stream of data at a set data rate over the period of an integer number of frame-timed periods on any assigned return channel. A "mobile terminal designation" and a "return channel assignment" would have been made by the LES 140 in an assignment package transmitted over the TDM forward channel to the respective mobile terminal 120, for example, in response to a request by the respective mobile terminal 120. A maximum loading or utilization capacity of a return channel with "messaging" activities appears to lie at 80% of the full capacity to which the return channel theoretically could become occupied with such "assigned time blocks" of message transmission.

The term "signalling" pertains to the transmission of short communications in short bursts of data within frame-timed discrete "slots" on an associated return channel of the particular channel group into which the mobile terminal 120 is logged, or requests to become logged. "Signalling" includes contention-based transmissions by any of the mobile terminals 120 directed to the LES 140 on any active return channels of any given channel group into which the respective mobile terminal 120 is logged, or attempts to become logged, such as assignment requests, logins, or routine periodic data reporting. Communication in such "signalling" mode also occurs as non-contention based "signalling" over "reserved slots" which are accessed by a designated mobile terminal 120 after having been assigned reserved slots in multislot transmissions. A first packet slot may have been obtained by contention, while subsequent slots in a multislot transmission would be reserved. However, the need for contention-based signalling over return channels for the mobile terminals 120, to initially gain access to the communication system 100, limits the maximum utilization of channels to be accessed by the terminals in the unreserved signalling mode to a practical limit of 25% when contention resolution is by "slotted Aloha", a known contention resolution protocol with a theoretical upper limit of utilization of 37%.

The present invention may be used advantageously in existing state-of-the-art communication systems. One of the known systems transmits bulletin board packets of network management information to mobile terminals in each frame of information and thus periodically at a set frame rate. The features of the invention may also be used advantageously in a newly developed communication system, though the operation of the newly developed system distinctly departs from the operation of the above, known system. The newly developed communication system is described in a copending patent application entitled "Methods of Communicating over Time-Division Multiple-Access (TDMA) Communication Systems with Distinct Non-Time-Critical and Time-critical Network Management Information Transmission Rates" by Santanu Dutta, and is assigned to the assignee of this application. The present invention is best described with respect to the communication system 100, the operation of which is pursuant to, and includes features of, the above-referenced copending application for patent.

One of such features involves classifying network management information into time-critical network management information and non-time-critical network management information. Data representing the non-time-critical network management information are separated from data representing the time-critical network management information. Time-critical data are transmitted at a frame rate over a TDM forward channel. In contrast to other systems, only non-time-critical network management data are formatted periodically as a bulletin board packet into a first of a predetermined sequence of the frames. The sequence of frames is referred to as a "superframe". Given that the sequence of frames is repetitively transmitted over the TDM forward channel, the individual frames are transmitted at a first rate, a frame rate, while the repetitive sequence of frames, the superframe, containing the non-time-critical network management data, is transmitted over the TDM channel at a second rate, a superframe rate, which is less than the frame rate. Details of the frame structures implementing the separation of time-critical and non-time-critical network management data are found below in reference to FIGS. 2, 3 and 4.

Figure 2:
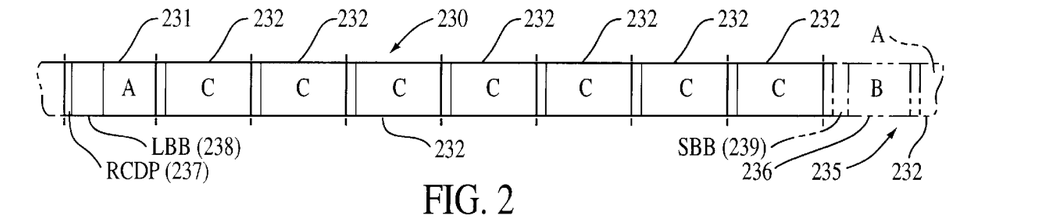
FIG. 2 depicts a preferred sequence of frames of data as may be transmitted at a specified data rate and frame rate over a TDM channel of any in-use channel groups of the communication system shown in FIG. 1.

FIG. 2 is a schematic representation of a sequence of frames formatted into a superframe 230. The superframe 230 shows, in sequence, a login frame 231, which is also identified in FIG. 2 by the letter "A" as a first type or type (A) of frame. The login frame 231 is followed by message frames 232, which are identified by the letter "C" as third type or type (C) of frames. A subsequent superframe 235 begins with a short bulletin board frame 236, which is identified by the letter "B" as a second type or type (B) of frame. The short bulletin board frame 236 is, in a continued transmission sequence of frames, followed by, correspondingly seven message frames 232, the alternate superframe 235 being of the same length as the superframe 230 and differing only from the superframe 230 by the substitution of the short bulletin board frame 236 for the login frame 231. In operating the system 100 in a preferred method as described, a continuous transmission of frames at the frame rate constitutes a continuous repetition of superframes at a superframe transmission rate which is less than the frame transmission rate. In such string of transmitted superframes 230 and 235, the pair of consecutively appearing alternate superframes may be considered a further hierarchial grouping at yet a slower rate of repetition.

Referring back to the individual frames of the superframe 230 or the superframe 235, all frames 231, 232 and 236 are of the same length for any given data rate at which data are transmitted over any TDM channel. At a data rate of 600 or 1200 bits per second the frame length is 1 second. The superframe length is independent of data rates and is established to be of a length of 8 seconds, such that there are an integer number of 10800 superframes 230 within a 24-hour period. Frame lengths shorter than 1 second are preferred at data rates higher than 600 and 1200 bps, such as frame lengths of 0.5 second and 0.25 second at data rates of 2400 and 4800 bps, respectively. Arranging the respectively shorter frames into the superframes of the fixed length of 8 seconds, raises the number of frames per superframe to 16 and 32 accordingly.

Each of the frames 231, 232 and 236 contain in leading byte positions a return channel descriptor packet (RCDP) 237 of time-critical network management data. The network management data in the RCDP 237 are time-critical because the network management information contains return channel mode and slot reservation flags, the settings of which are required for decision making with respect to immediately subsequent transmissions by any of the mobile terminals 120 (FIG. 1) receiving the information.

The login frame 231 is inserted into the sequence of frames, as shown in FIG. 2, only once every other superframe of the sequence of alternating superframes 230 and 235. The network management information contained in a data packet of the log in frame 231, referred to as a long bulletin board 238, is termed "non-time-critical". The non-time-critical information conveyed via the long bulletin board 238 will change either infrequently, or linearly with time. A repetition or even updating of "non-time-critical" information at the frame rate would unnecessarily consume valuable channel time. A receipt of the login frame 231 is essential for any mobile terminal 120 of the first category 122 (FIG. 1) of mobile terminals seeking to log into the respective channel group of the TDM forward channel which is transmitting the login frame 231. The long bulletin board 238 contains all, hence a complete set, of the information which is required by a mobile terminal 120 (FIG. 1) to log into the assigned channel group. Certain of the non-time-critical network management information is omitted from the long bulletin board 238 to form, as a subset thereof, a short bulletin board 239. The information particularly selected for such omission includes a current date code and a serial table of frequencies of in-use return channels of the particular channel group, 161, 171 or 181.

Figure 3:
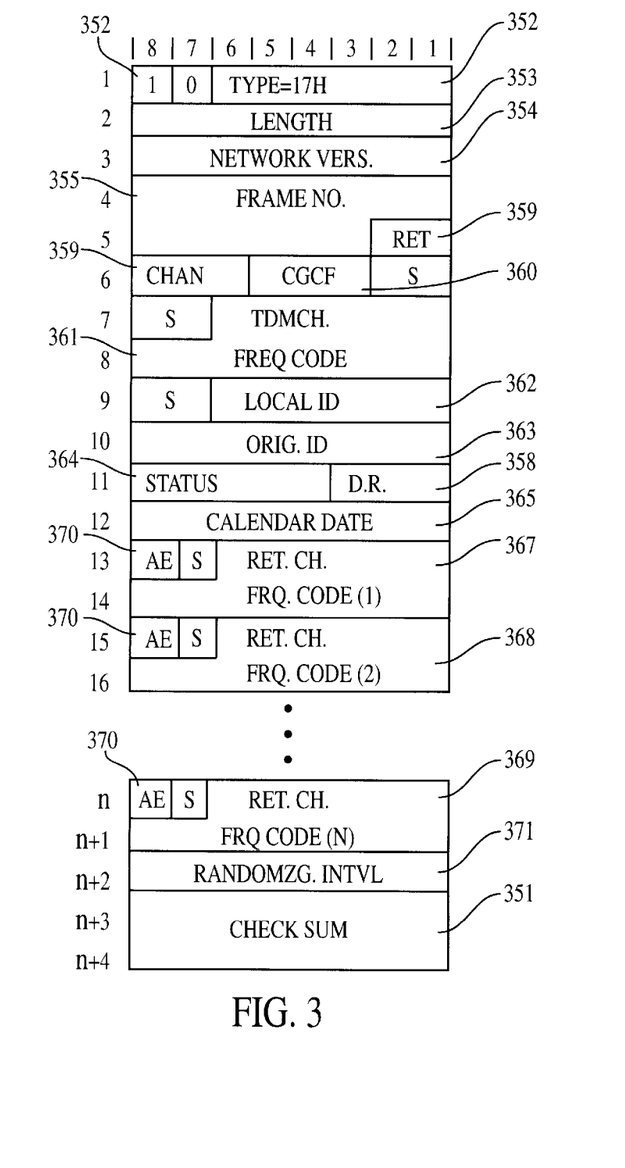
FIG. 3 schematically shows a bulletin board structure of a login type frame of the preferred sequence of frames of data shown in FIG. 2, the bulletin board structure including channel group congestion information which is advantageously employed in methods pursuant to the invention.

FIG. 3 depicts schematically a representative data field structure of the long bulletin board 238, and as a subset thereof, of the short bulletin board 239. The data byte fields of the long and short bulletin boards 238 and 239 include a combination of general descriptor data fields as may be found in bulletin boards of prior art systems in addition to data fields for transmitting information which relates specifically to this invention. It is to be noted, that data which are specific to the invention may conceivably be included in spare or open data fields of prior art bulletin board structures to convert such prior art system to operate pursuant to the invention. The format of data fields in the long and short bulletin boards 238 and 239 is compatible for transmission over commercial satellite links, such as a satellite link known as AMSC-1. Referring to particulars shown in FIG. 3, columns from left to right identify bit positions of data bytes of the long bulletin board 238, starting with bit number 8 on the left to bit number 1 on the right. The first or leading byte position of the long bulletin board 238 is shown at the top of FIG. 3, while an error detection check sum field 351 is located at the end and bottom of the block of the long bulletin board 238. The first three bytes of the long bulletin board 238 are data fields for packet type, length and network version descriptors 352, 353 and 354. The fields 352, 353 and 354 are also contained in the short bulletin board 239.

A frame number field 355 in bytes 4 and 5 allocates 14 binary bit positions to a sequential frame count over a 24 hour period. The frame number field 355 is also included in both the long and short bulletin boards 238 and 239 providing a continuously incremented count of superframes. It is preferred to begin any 24-hour count at the beginning of each day with a superframe having the short bulletin board 239. Thus, the frame number field 355 in the short bulletin board 239 gives an odd-numbered count identifying an odd numbered superframe 235, while the login bulletin board 238 gives an even-numbered count identifying an even-numbered superframe 230. The transmitted superframe count is used by the mobile terminals 120 (FIG. 1) to compute therefrom a current frame count as frames are received over the respective TDM channel. Such computation is based on on a linear time progression from a most recently obtained superframe count from either the long or short bulletin board 238 or 239. A three bit data rate code for both the forward and return channels is given in a data rate field 358 of bits 3,2 and 1 in the 11th byte of the long bulletin board 238. The data fields of the short bulletin board 239 are substantially the same as for the long bulletin board 238 through the 11th byte position. Thus, the subset of data fields of a short bulletin board 239 is formed by adding the check sum field 351 after the 11th byte position shown in FIG. 3.

Bridging the 5th and 6th bytes is a 5-bit field which represents an active return channel count designator 359. The active return channel count designator 359 is followed by a 3-bit field for a channel group congestion factor (CGCF) 360. The CGCF is a quantified loading or congestion indicator for the respective channel group. The CGCF 360 categorizes a current transmission congestion of the channel group involving both forward and return channels as falling into one of eight loading or congestion categories. The value of the CGCF 360 constitutes, as a current channel group load indicator, load balancing information for use by the mobile terminals 120 which are presently not logged into the respective channel group of the CGCF 360, but which are programmed to log into the particular channel group. The significance of the CGCF 360 is further explained in the detailed description in reference to FIG. 5.

A 14-bit field 361 in byte positions 7 and 8 provides a frequency code of the absolute frequency of the TDM or forward channel. The frequency code field 361 is followed by a local I. D. field 363, an originating I.D. field 363 and a system status field 364. Other bit positions of the long and short bulletin boards 238 and 239, which are not specifically identified hereby are left blank or labelled with the letter "S" to indicate either vacant or "spare" fields for future use. The data byte fields between, but excluding, data rate (D.R.) 358 and check sum 351 are specific to the long bulletin board 238 and do not form part of the short bulletin board 239. Thus, in the short bulletin board 239, the check sum field 351 follows the status and data rate fields 364 and 358.

Of the data fields specific to the long bulletin board 238, the data field 365 in byte position 12 provides a current calendar date code to the mobile terminals which is transmitted to the mobile terminals 120 in a sequence of current year, current months, and current day over three consecutive transmissions of the long bulletin board 238. The calendar date field 365 is followed by a sequence of return channel frequency fields 367, 368 and 369 as, respectively a first, second and nth descriptor field of a serial table of frequencies of all in-use return channels within the respective channel group. A two-bit field 370 may be associated with each of the return channel frequency fields 367, 368 and 369 to set a use code for other than mobile land use. A randomizing interval designator field 371 follows in byte position (n+2) the return channel frequency fields. The randomizing interval designator field 371 is followed by the check sum field 351 in bytes (n+3, n+4) at the end of the long bulletin board 238, keeping in mind that the check sum is also the last field of the data packet of the short bulletin board 239.

Figure 4:
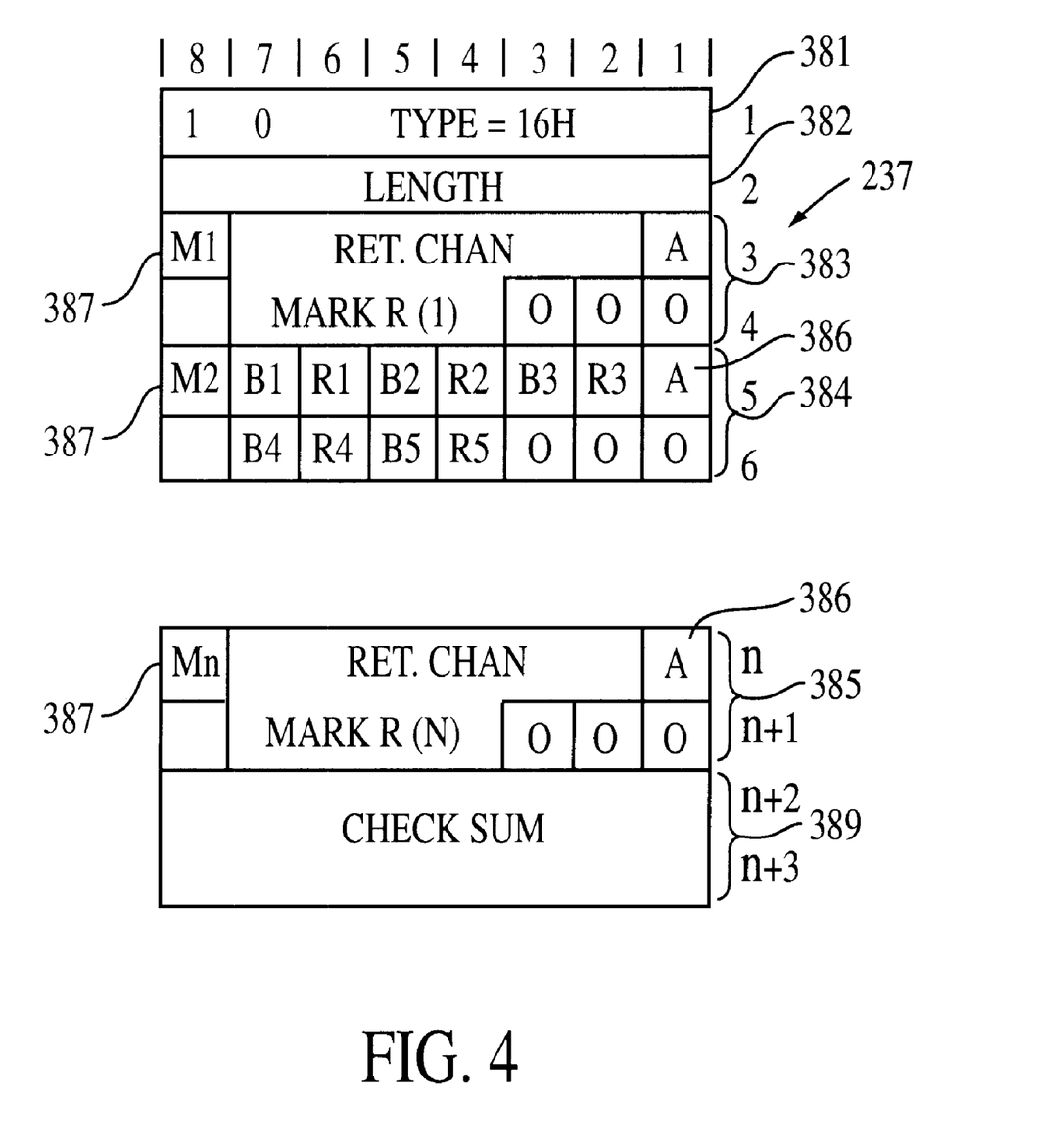
FIG. 4 schematically shows a preferred structure of time-critical network management information to be transmitted at the frame rate over any of the TDM channels of the communication system shown in FIG. 1.

FIG. 4 shows the arrangement of "time-critical" network management data in the return channel descriptor packets (RCDP) 237. The return channel descriptor packets 237 contain typical packet type and length identifying fields 381 and 382 in byte positions 1 and 2. The packet identifiers 381 and 382 are followed by return channel marker fields 383, 384 and 385 which relate respectively to the frequency code fields 367, 368 to 369 in the most recent long bulletin board 238. The return channel marker fields 383, 384 to 385, consequently describe the status of the 1st, the 2nd down to the nth in-use return channel. The channel marker fields 383, 384 to 385 of the RCDF 237 show, among other, the slot status of the transmit frame corresponding to the receive frame containing the RCDP 237. A single RCDP describes the slot status of all in-use return channels of a particular channel group. Thus, as the number of in-use return channels of a channel group varies, based on traffic conditions in such channel group, so varies the length of the RSDP.

The return channel marker fields 383, 384 and 385 show in the 1st bit position of the leading byte a slot preemption bit 386 "A", and in the 8th bit position of the leading byte a message mode reservation bit, known as MMR bit 387. The MMR bit 387 is a signalling-messaging mode flag for each respective, in-use return channel 1, 2, . . . n, and is shown as "M1", "M2", and "Mn" for, respectively, the 1st, 2nd and nth in-use return channels. The MMR bit 387 is time-critical in that by being set to "1" or to "0", it establishes the transmission mode for the duration of the following timing period as being, respectively, a messaging mode or a signalling mode.

Further bit positions in each of the return channel marker fields 383, 384 and 385 are allocated to two slot marker bits for each slot in the corresponding frame period of the respective return channel. The logical state of the first slot marker bit indicates whether the previous slot of a particular multislot packet sequence was correctly received by the LES 140 (FIG. 1). The second slot marker bit indicates whether the particular slot is reserved during the next respective frame timing period. The number of signalling slots in each frame timing period depends on the data rate at which data are transmitted over the return channel, and on the length of the transmit frame timing period. The transmit frame has been described above as being either 1 second, 0.5 second or 0.25 second long, depending on the data rate at which data are transmitted over the respective TDM channel of the channel group. The preferred operation of the communication system 100, as described in the above-referenced application for patent, contemplates that, depending on what combination of data rates is used, there may be 1, 2, 3, 5 or 6 signalling slot positions per return channel timing period or frame. To emphasize, the return channel timing period, or return channel timing frame, is determined by, and is the same in duration or length as, the duration or length of the forward channel frame. The fields 383, 384 and 385 have a corresponding byte length to accommodate, in addition to the slot preemption bit 386 and the message mode reservation bit 387, either 2, 4, 6 10 or 12 single-bit fields for the described slot markers. It will be understood that the return channel marker fields 383, 384 and 385 are consequently either one or two bytes long, with unused bit positions being left undefined. The return channel marker fields 383, 384 and 385 are followed by a typical 2-byte check sum field 389 for the RCDP 237.

2. Detailed Description of the Preferred Methods.

Referring back to FIG. 1, any of the channel groups 161, 171 or 181 may exceed at any time maximum traffic load capacities. In a specific example, for purposes of illustration and not of limitation, the following traffic conditions are assumed: (a) the channel group 161 has been carrying consistently high levels of user communications which are well above a desired, normal capacity level, with occasional peaks of usage exceeding momentarily maximum capacity levels; (b) the channel group 171, on the other hand, is experiencing message traffic which is below a desired level; and, (c) another channel group, the channel group 181, is experiencing currently the lowest level of message traffic. Unacceptable overload conditions occur when an upper range of channel utilization levels, or capacity, remains exceeded over prolonged, observable time periods, as opposed to short and temporary overload peak demands on the communication system 100.

In seeking login to a particular channel group, respective mobile terminals 120 of the category 122 tune into stored TDM channel frequencies. One forward TDM channel frequency per spot beam is programmed into each of the mobile terminals 120 as the primary TDM channel for the respective spot beam. However, other secondary TDM channel frequencies may be added to, or deleted from, lists stored by the mobile terminals 120, from past frequency assignments, or, more generally from information received from, or broadcast by, the LES 140. Mobile terminals 120, according to the described embodiment, store, on logout prior to entering a "sleep period" the TDM channel frequency of the last-used channel group. When seeking log in after completion of such "sleep period", the latter mobile terminals 120 are programmed to log into the most recently used channel group, regardless of whether the most recently used channel group was the primary channel group or a secondary channel group. For purposes of the example, the mobile terminals 120 of the first category 122 are those mobile terminals 120 which are programmed to seek login to the channel group 161. When attempting to log in, such mobile terminals 120 would contend for signalling slots, as they may become available. However, in the example, during the period of channel congestion, namely a high traffic level which exceeds established maximum percentile loads of channel capacity for the channel group 161, access to signalling slots would expected to be extremely limited. Contention by several terminals for a limited number of signalling slots, results however, in an increase in collisions, in a resulting increase in re-attempted signalling and, therefore, further channel traffic congestion. In prior art systems attempted logins by the mobile terminals 120 of the first category 122 could not be prevented. If the mobile terminals 120 were to seek login to such systems, the mobile terminals 120 of the first category 122 would be expected to experience problems and relatively long delays, further increasing the channel loads by mere attempts to log into the channel group 161.

An advantageous feature of the preferred methods herein involves transmissions by the LES 140 of channel group load balancing information, which is non-binary, and which permits the mobile terminals 120 to make "intelligent" decisions, as to whether and when to move from a first channel group to a second, less loaded, channel group. The "Channel Group Congestion Factor" or CGCF 360, is preferably incorporated into the network management information which is described above as the long bulletin board 238 (FIGS. 2,3). Being transmitted by the LES periodically as part of the long bulletin board 238, the CGCF 360 will be received and interpreted by the mobile terminals 120 of the first category 122 before any such mobile terminals 120 even attempt to log into the channel group 161, for example. The CGCF 360, as a 3-bit binary number, pursuant to the preferred embodiment, establishes a range of eight integer scaled values by which channel congestion can be measured during interpretation of the CGCF by the mobile terminals 120 of the first category 122. A range of 8 distinct values has been chosen for the CGCF 360 to afford the mobile terminals 120 a "soft-decision" criterion for chosing alternate, secondary channel groups for login. Thus, according to one embodiment, the terminals 120 may select a second channel group other than the congested channel group 161, per example, based on the lowest value of the CGCF of other available channel groups.

Figure 5:
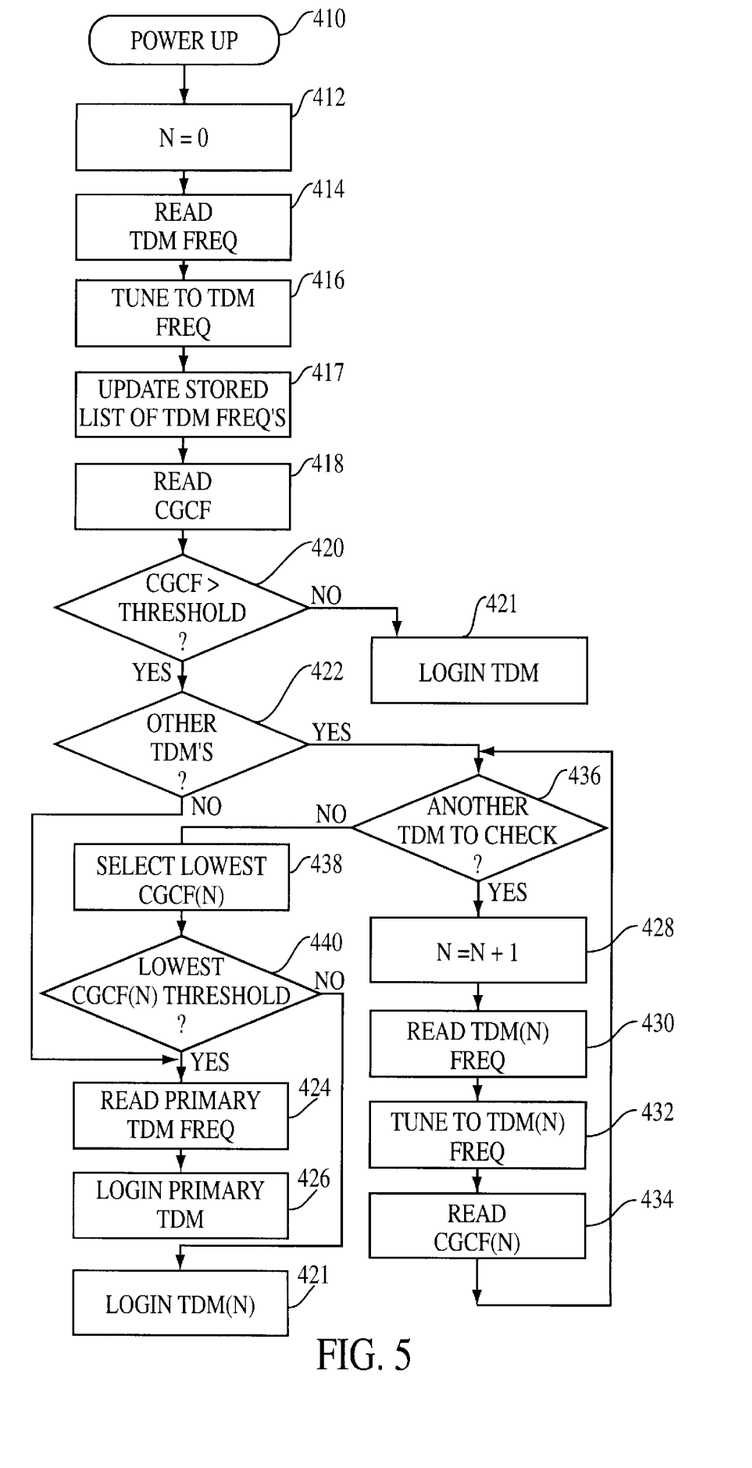
FIG. 5 represents a flow diagram of TDM channel selection decisions made by mobile terminals shown in FIG. 1.

FIG. 5 is a flowchart showing a login procedure by the mobile terminals 120 using the CGCF 360 as a soft decision criterion for determining whether to log into a first or into a second, alternate channel group. On power up 410 after a sleep cycle the mobile terminals 120 begin immediately with a login procedure. Initial values are set, as shown at 412. The mobile terminals 120 proceed to read a last-used TDM channel frequency, in step 414, and proceed to tune to such frequency, at 416.

The mobile terminals 120 carry besides the preprogrammed primary TDM forward channel, a list of secondary TDM channel frequencies which may be active within the current spot beam. To avoid carrying in such stored list old secondary TDM frequencies that have been removed from service, it is necessary to keep the stored list current. The mobile terminals 120 update such stored list of TDM frequencies upon occurrence of any of the following conditions—(a) when one of the mobile terminals 120 is unable to acquire a secondary forward TDM channel (in such case, a reference to the secondary forward TDM channel and its frequency are deleted from the stored list), and (b) when a list of active channel groups, broadcast by the LES 140, excludes or includes previously stored TDM channel frequencies. Updating of the stored list of secondary TDM channel frequencies is shown as step 417 in FIG. 5.

After successfully acquiring the last-used TDM channel, the mobile terminals 120 read the login information of the long bulletin board 238, including a value of the CGCF 360, at 418. The the value of the CGCF 360 is compared to a "threshold value" (for the CGCF 360), which threshold value is stored within each of the mobile terminals 120, shown by the query or decision block 420.

The threshold value is a predetermined decision value of the CGCF. Setting of the threshold value involves preferences with a certain degree of choice. However, to arrive at the threshold value one must also take into consideration any parameters which determine the value of the CGCF 360. Such parameter, pursuant hereto are load conditions of the TDM forward channel and any and all return channels of a channel group, and their limiting values any one of which can raise the value of the CGCF separately or in conjunction with any of the other load conditions to an undesirably high value. As an example, the CGCF should be raised to its maximum value, when any one, separately, of the established maximum utilization levels of respective channels and operating modes in the communication system 100, approach a maximum. Thus, when a TDM forward channel utilization exceeds 70% of the maximum utilization level, the CGCF will be above threshold, regardless of the traffic loads on the return channels. Similarly, when the messaging traffic exceeds 80% of the maximum return channel capacity, or when the signalling levels have reached a level at which 25% of available signalling slots are in contention, the CGCF will be above threshold, regardless of the congestion in the TDM forward channel. Conversely, when all three of the above load parameters are below their respective maximum values, the CGCF 360 will be below threshold. The threshold value stored in the mobile terminals 120 would need be chosen to reflect in any comparison with the CGCF 360 the above results.

When considering the above parameters or factors of the CGCF 360 in greater detail, it is noteworthy that the message mode on the return channels is demand-assigned and closely controlled by the LES 140. Assuming a close to complete accommodation of messaging traffic on the respective return channels (e.g., return channels 162, 163, etc. of the channel group 161), then the message load on the return channels can be assessed in terms of its effect on signalling, namely, by measuring a normalized waiting time for unreserved signalling slots. Consequently, it is preferred to establish a congestion factor element of the CGCF 360 in terms of two signalling mode parameters, a return channel signalling mode utilization level, and the normalized waiting time for an unreserved signalling slot. The return channel signalling mode utilization level is preferably determined by ascertaining, as a fractional value of all available signalling slots, the number of signalling slots during which signalling bursts were received. The value would be computed over all available return channels (162, 163, etc.) of the respective channel group 161 and may be averaged over short time periods, when and as necessary, to arrive at a meaningful value. The normalized waiting time for an unreserved signalling slot is the time period the mobile terminals 120 have to wait to access an unreserved slot, which is averaged over all of return channels 162, 163, etc. of the respective channel group 161, for example, and divided by a predetermined maximum value, which may be set by an operator, a preferred value given as an illustrative example being 0.5 second. A preferred load measurement for the TDM forward channel 160, for example, of the channel group 161, to be factored into the CGCF is a TDM utilization factor which is the average of the used or filled fraction of all available user space in the forward frames. The average is preferably computed over an operator-determined time interval, such as a period of five minutes, for example.

Referring now back to the flow diagram of FIG. 5, if, in step 420, the result of comparing the CGCF to the stored threshold value had been negative, that is, the CGCF 360 had not been greater than the threshold value, the mobile terminals 120 would have proceeded to log into the channel group 161, as shown in step 421. However, in the chosen example, the CGCF broadcast for the channel group 161 would compare in step 420 to be greater than the stored threshold value. At this point in the procedure, the mobile terminals 120 would determine from the stored list of secondary TDM frequencies, at 422, whether other TDM channels, hence other channel groups, are available to log into.

As part of normal operations, the mobile terminals 120 are expected to acquire a table of other, secondary TDM frequencies which are in use within the spot beam region of interest. Such acquisition may be incidental by reassignment of the mobile terminals 120 to secondary TDM channels on login, or the acquisition of the secondary TDM channel frequencies may come about by move commands issued by the LES 140 in accordance with a feature hereof. It further appears practical to transmit to all mobile terminals 120 upon initial login within a particular spot beam region, a data packet of in-use secondary TDM channels for storage in the respective mobile terminals 120.

If the query at 422 is answered in the negative, hence, there are no secondary TDM channels which can be accessed by the mobile terminals 120, the mobile terminals 120 would read the respective primary TDM frequency at 424, and attempt to log into the primary TDM channel for the respective mobile terminals 120. In view of the foregoing, one expects that the query at 422 is answered in the affirmative. Iterating, including indexing a search parameter at 428, reading the respective TDM frequency at 430, tuning to the respective TDM channel frequency at 432, to acquire login data, and reading as part of the login data the respective CGCF at 434, the CGCFs of all available secondary TDM channels are acquired by the mobile terminals 120. When a query at 436 is answered in the negative, showing the acquisition of respective CGCF values for available channel groups to be complete, the mobile terminals compare the acquired CGCF values to select, at step 438, the TDM channel having broadcast the lowest CGCF value, relatively to all other CGCF values. However, a query at 440 determines whether the low CGCF value exceeds the threshold value stored in the mobile terminals 120. If the query is answered in the affirmative, the mobile terminals 120 proceed to read the primary TDM frequency and attempt to log into the primary TDM channel in steps 424 and 426, respectively. By selecting the channel group having the lowest CGCF in step 438 and checking whether the CGCF is less than the threshold value of the CGCF, the mobile terminals 120 actually establish, that there exists indeed a preferred channel group from a viewpoint of balancing channel loads. Selecting, for login, the channel group with the lowest CGCF, provided the CGCF lies below the threshold CGCF value, in lieu of any other available channel group, results in balancing channel loads within the respective spot beam of the communication system 100.

Thus, if the lowest CGCF value does not exceed the threshold value, as determined by a negative outcome of the query at 440, the data terminals 120 will proceed to log into the secondary channel group of the respective TDM channel having the lowest CGCF value, per step 442. In the described example, the mobile terminals 120, after having followed through the above procedure, will have selected the channel group 181 as a preferred channel group to effect load balancing among the channel groups, and will log into the channel group 181 (FIG. 1), as a channel group having a CGCF value, which is the lowest when compared to the CGCF values of all other available channel groups 161 and 171.

According to another, presently preferred, embodiment, the CGCF 360 may be used by the mobile terminals 120 to "intelligently" effect a move from a first to a second channel group without first comparing broadcast CGCF values, from all available secondary TDM channels, to each other, as in the above-described embodiment. The presently preferred embodiment is described below, using the same example of channel congestion among the representative channel groups 161, 171 and 181 as in the above process, described in reference to FIG. 5. According to the following, preferred embodiment, when the first channel group 161 is determined to be congested, the CGCF values of any other available channel groups, such as channel groups 171 and 181 will then be compared, in sequence, to the threshold value of the CGCF 360. The mobile terminals 120 will then proceed to log into any available secondary channel group with respect to which the CGCF value does not exceed the threshold value. Consequently, the mobile terminals 120 will select and log into the first available channel group, as the preferred channel group, with respect to which the broadcast CGCF does not exceed the threshold value.

Figure 6:
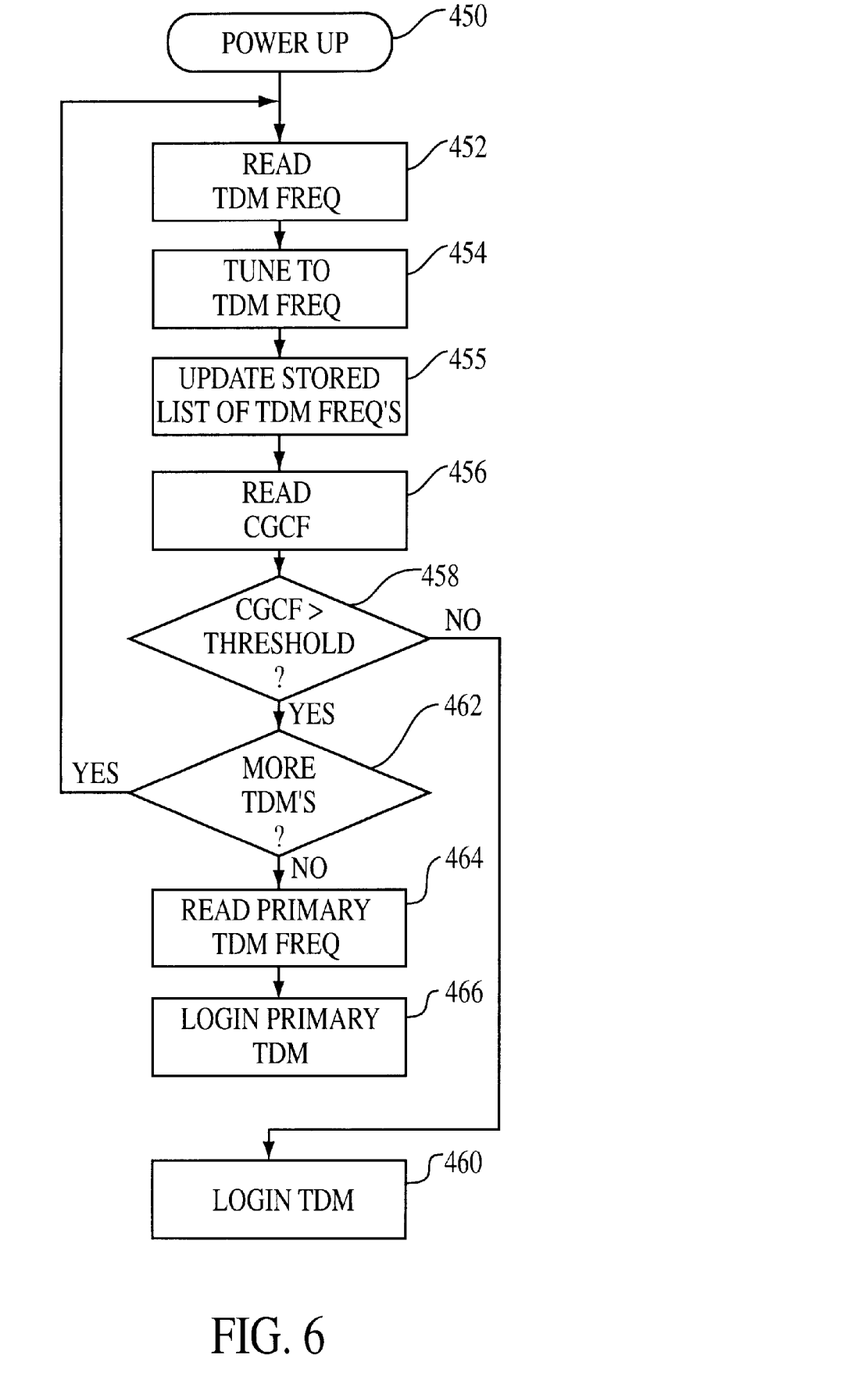
FIG. 6 shows a flow diagram of a variation of TDM channel selection decisions by mobile terminals, with respect to those represented in FIG. 5.

FIG. 6 illustrates the latter, preferred channel group selection process. The process is illustrated as beginning when the power to the mobile terminals 120 is turned on. On power up, after a sleep period, as shown in step 450, the mobile terminals 120 read the frequency of the last-used TDM channel, whether this is the primary TDM channel or a last used secondary TDM channel, in the chosen example, the TDM channel 160 of the congested channel group 161. The mobile terminals 120 tune to the TDM channel 160 in step 454. A stored list of secondary TDM frequencies is updated in step 455, in the same manner as described above with respect to the previous embodiment in reference to step 417 in FIG. 5.

Thereafter, the mobile terminals 120 read the CGCF broadcast in the respective login frame 231, as shown in step 456. In a query 458, the acquired CGCF for the channel group 161 is compared to the threshold value stored in the mobile terminals 120. If, in the query 458, the result had been negative, hence the CGCF had not been greater than the threshold value, the mobile terminals 120 would have proceeded to log into the channel group 161, as shown in step 460. However, in the chosen example, the CGCF broadcast for the channel group 161 will be greater than the stored threshold value, resulting in an affirmative outcome of the query 458, because the CGCF reflects the stated excessive traffic load in the channel group 161, the mobile terminals 120 proceed to search for other TDM channels in a query 462 as to the availability of more TDM channels. The mobile terminals 120 as described with respect to FIG.

5, are expected to have available a table any secondary TDM channels and their respective frequencies. If no further TDM channels are available, as is determined by a negative outcome of the query at 462, the data terminals 120 read the respective primary TDM frequency at 464 and proceed to attempt to log into the primary TDM channel at step 466, regardless of whether the value of the CGCF broadcast by the respective primary TDM channel exceeds the threshold value, which would be the case for the TDM channel 160. If the query 462 is answered in the affirmative, the mobile terminals 120 will repeat steps 452 through 456, provided the query 458 is also answered in the affirmative. A negative response to the query 458 will cause the mobile terminals 120 to log into the TDM channel currently under consideration, having selected a preferred channel group for use to effect load balancing, in that such TDM channel is the first-available TDM channel which has broadcast a CGCF with a value less than the threshold value stored by the mobile terminals 120, per step 460. A negative response to query 462 will cause the mobile terminals 120 to log into the primary TDM channel, pursuant to steps 464 and 466. It is to be noted that, according to the preferred, simplified TDM channel selection process by the mobile terminals 120 seeking to log into the communication system 100, the respective mobile terminals 120 do not search out the TDM channel of the channel group with the relatively lowest CGCF of all available secondary channel groups, but select, as described, for the preferred channel group a first encountered channel group with a TDM channel having a CGCF lower than the threshold value set in the mobile terminals 120.

It should be understood, that various changes and modifications may be made with respect to the above TDM channel selection processes, as described in reference to FIGS. 5 and 6. Advantages, which may have become apparent from the above, may become more apparent when summarized in reference to FIG. 1. When the mobile terminals 120, of the first category 122, first power up to log into a channel group, such as the channel groups 161, 171 or 181, there is available to the mobile terminals, channel load balancing information from the LES. The channel load balancing information permits the mobile terminals 120 to intelligently select an optimum channel group for login in the presence of excessive channel usage at the time of any attempted login. Further, the channel load balancing information is available to the mobile terminals 120 during the login procedure without the mobile terminals 120 loading the channel groups or the processing resources of the LES 140, as would have occurred had the obtaining of channel load balancing information required any transmission by the mobile terminals 120. Significantly, intelligent login decisions are made independently by the mobile terminals 120, based on a 3-bit channel group congestion factor which is broadcast by the LES 140 at a rate less than the frame rate.

In reference to FIG. 1, it is also to be understood that a relative message traffic congestion of one channel group with respect to other channel groups is generally due to communication with the mobile terminals 120 which are already logged into the congested one of the channel groups, namely those of the second category 124. The described methods of diverting additional mobile terminals 120, which are desirous of logging in, to another, less loaded channel group, avoids aggravation of the existing channel overload condition.

However, traffic load levels of in-use channel groups can become sufficiently imbalanced that simply diverting new logins no longer establishes an adequate load balance among the respective channel groups. This is particularly true when substantially all assigned mobile terminals 120 are already logged into a respective one of the channel groups, so that there is an insignificant number of mobile terminals 120 by which message loads can be redistributed through logins to underutilized channel groups.

Accordingly, it is further contemplated herein to balance loads of in-use channel groups by transmitting over the TDM channel of a channel group (say channel group 161) which may be overutilized relative to the other channel groups 171 and 181, as in the foregoing example, channel group load balancing information which is directed to the currently logged-in mobile terminals 120, hence to those of the second category 124.

Figures 7, 8:
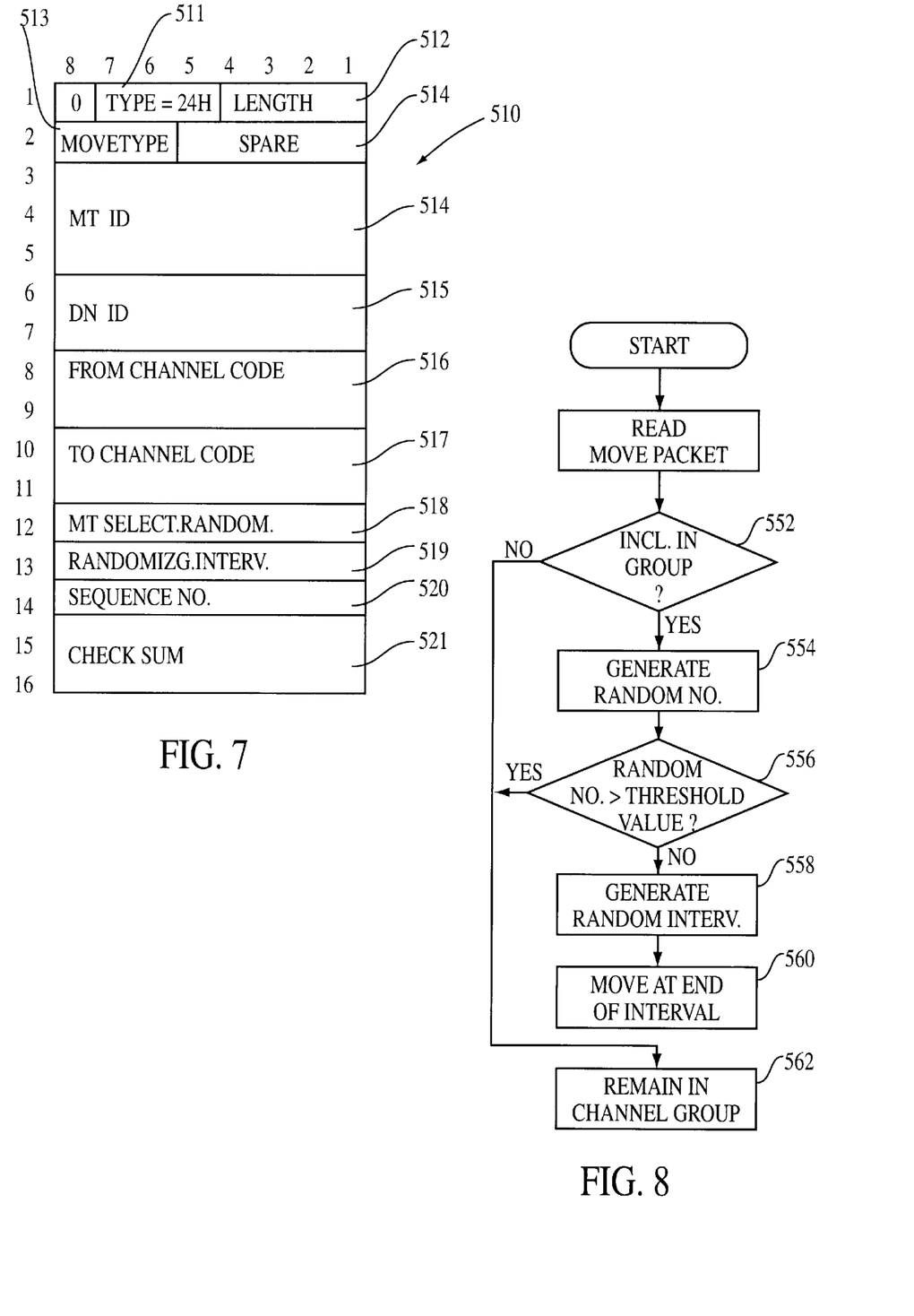
FIG. 7 is a schematic diagram of the structure of a TDM channel group load balancing service packet that may optionally be transmitted over a selected TDM channel of any in-use channel groups of the communication system in FIG. 1, to cause a statistically selected number of mobile terminals, which may at the time of transmission of the load balancing service packet be logged into the channel group of the selected TDM channel to log into another channel group for balancing communication traffic loads among the in-use channel groups of the communication system of FIG. 1.
FIG. 8 shows a flow diagram of steps pertaining to operations of mobile terminals following the receipt of TDM channel group load balancing service packet as shown in FIG. 7.

Accordingly, the LES 140 transmits, over the TDM forward channel, channel group load balancing information in the form of a channel group load balancing service packet 510, the field structure of which is depicted in FIG. 7. The following description is therefore best read in reference to FIGS. 1 and 7. The channel group load balancing service packet 510 is a "move-directing" instruction which is addressed to one or more currently logged in mobile terminals 120. A first byte contains fields of typical protocol data packet identifiers, such as a packet type 511 and a packet length 512. Byte two contains a move type identifier field 513, and bits 1–5 of the second byte are left blank, providing a spare field 514 for possibly future use. The move type identifier 513 may designated any of 8 distinct classes of moves, of which three are currently designated, while the other are left to future categorization. The three move-types which are currently contemplated to be specified are (a) an individual mobile terminal 120 shall move, (b) only mobile terminals 120 selected from those having a specified DNID, a specific group identification, shall move, and (c) mobile terminals 120 selected from all mobile terminals 120 which are currently logged into the respective channel group, such as the channel group 161, shall move.

Bytes three through five provide a 24-bit forward channel mobile terminal identification field 514 for any specific one of the mobile terminals 120. When a group of mobile terminals 120 is addressed, the data in the mobile terminal identification field 514 are ignored, based on an interpretation of the move-type field 513. A 16-bit field 515 is a "DNID" group identification field 515, which will be interpreted when the move-type field specifies that mobile terminals 120 selected from a specific group shall move. A particular group that may be specified by the identification field 515 might be mobile terminals 120 assigned to a specific customer, or to a particular dispatch office of a specified customer, to give, without intending to limit, specific examples. The group identification field 515 is followed by a "From-Channel" designation field 516, for setting forth a TDM channel frequency code "from" which any mobile terminals 120 shall move. A "To-Channel" designation field 517 sets forth a new TDM channel code, hence, the TDM channel frequency "to" which any moving mobile terminals 120 shall move.

It is to be noted that the foregoing options of the move packet 510 provide for instructing a single, specific mobile terminal 120 to move from one channel group to another. However, advantages are derived by instructing yet unidentified ones of the mobile terminals 120 to move from one designated channel group (e.g. the channel group 161) to another (e.g., the channel group 171). It may, for example, be desired to move a specified fraction of currently logged in mobile terminals 120, either of a certain DNID group, or of the entire population of logged in mobile terminals from one to another channel group. It would clearly be burdensome on the LES 140 to send the move packet 510 individually to each mobile terminal 120 of a selected fraction of mobile terminals 120 of the second category 124. Instead, it is advantageous to broadcast a single move command, such as the move packet 510, to all logged in mobile terminals 120, addressing in the move command 510 a group of the mobile terminals (e.g., DNID number or "all"), and providing for the mobile terminals 120 of the addressed group to make independent statistical decisions, based on random selection processes, on whether to actually move. Accordingly, each of the mobile terminals 120 makes its own selection, as to whether and when to move, though decision criteria are transmitted by the LES 140 in the move packet 510.

A random selection field 518 (MT SELECT. RANDOM.) contains an 8-bit selection randomizer code, which is used by a respectively specified group of the mobile terminals 120 as a threshold value, to determine whether to initiate a move. All mobile terminals 120 of, for example, a group specified in the "DNID" group specification field 515 will generate a random number in a bounded range, such as between 0.0 and 0.99 and will compare the random number to the magnitude of the selection randomizer code, as a threshold value, specified in the random selection field 518, the threshold value being also contained within the same bounded range within which the random number is generated. Of, for example, the random number generated by any one of the mobile terminals 120 is less than the threshold value specified in the random selection field 518, the mobile terminal 120 will have identified itself as being one of the mobile terminals which are to move to the new channel group, pursuant to the instructions contained in the move packet 510. The LES 140 controls, statistically, the number of the mobile terminals 120, within the specified group (in the group specification field 515) or including all of the mobile terminals 120 logged into the particular channel group (such as the channel group 161), which are subject to move. However, the mobile terminals 120 internally identify themselves as belonging to the statistical group which is subject to the move, by generating a random number and making a comparison to the threshold value set forth in the random selection field 518. It should be noted that the LES 140 has the option of designating all of a group, or all mobile terminals 120, to move from the channel group designated in the field 516 by setting the threshold value to 0.99. When this is done, all randomly selected numbers must, by range definition, be below 0.99, and, hence, all of the mobile terminals 120 must elect to move.

When a large number of the mobile terminals 120 are instructed to move, such as when the LES 140 designates a substantial portion of all of the mobile terminals 120 which are logged into the respective channel group, then the move initiation by the mobile terminals 120 must be spread over a comparatively large time interval to avoid temporary overload of the signalling channels, which would result in signalling channel collisions by mobile terminals contending for the same available signalling slots during login. An 8-bit (RANDOMIZG. INTERV.) randomizing interval field 519 sets forth a randomizing interval in terms of a number of frames starting with the number in which the move command is given, over which moving mobile terminals 120 must spread the initiation of the move. Each of the moving mobile terminals 120 will generate a random number to determine a corresponding random interval starting from the period of the frame during which the move packet 510 was received, after which the move is initiated by the respective mobile terminal 120.

A significant feature of the preferred methods herein is that the LES 140 transmits channel group load balancing information, which are capable of addressing a plurality of mobile terminals and obtain a result from a number of the mobile terminals 120, without having identified the particular mobile terminals 120 which moved. FIG. 8 shows a flow diagram of steps undertaken by all of the mobile terminals 120 which are addressed as a group by the respective move packet 510 described with respect to FIG. 7. Reference should be made to both FIGS. 7 and 8 for the following description of steps. The mobile terminals 120, currently logged into the channel group (e.g. channel group 161) including the TDM forward channel 160, over which the move packet is transmitted, will read the move packet 510 as indicated in step 550. The mobile terminals 120 will query, in step 552, based on the value in the move type field 513 and the information in the group identification field 516 (FIG. 7), whether the respective mobile terminal is included in the group of mobile terminals which is subject to selective moves to another channel group as instructed by the move packet 510. If the outcome of the query 552 is affirmative, the respective mobile terminal generates a random number, as set forth in step 554, to compare against the threshold value specified in the data field 518 of the move packet 510. A query 556 compares the generated random number to the threshold value in data field 518. As described above, if the generated random number is less than the threshold value in data field 518, the query at 556 is answered in the negative and the respective mobile terminal has identified itself as being subject to move to the second, new channel group as specified by the move packet 510. In step 558, the mobile terminal generates a random interval number contained in a range that is bounded at the low end by zero and at the upper end by the number specified in the randomizing interval field 519 of the move packet 510. The random interval number, generated by the mobile terminal, corresponds to the number of frames the mobile terminal waits before executing the channel move. In that regard, the random interval number constitutes a random frame delay up to the maximum number of frames specified in the randomizing interval field 519. Thus, with a large number of the mobile terminals 120 having made a decision to move, the instances at which the mobile terminal initiate their respective moves to the new channel group become randomly spread over the number of frames specified in the randomizing interval field 519. Each of the mobile terminals subject to the move will move to the new channel group, as shown by step 560.

If the respective mobile terminal determines by a negative outcome of the query 552 that it is not part of the group subject to a move, as specified by the move packet 510, or if the mobile terminal determines that it is exempt from such move, as determined by an affirmative outcome of the query 556, the mobile terminal will ignore the move commands of the move packet 510 and remain and continue to operate in the current channel group, as shown by step 562.

In further reference to FIG. 7, a sequence number field 520 is used substantially like a polling number in prior art systems. The sequence number field 520 merely designates the number of times that the same instruction has been re-transmitted, to ensure a better probability of the mobile terminals 120 having received the respective data packet, in the face of potential blockages common in a mobile satellite channel. Once the data packet has been received by a particular one of the mobile terminals 120, repeated reception of the same data packet is ignored by such mobile terminal. The move packet 510 terminates with a typical check sum field 521 by which the mobile terminals 120 may determine the correctness of receipt of the transmitted move packet 510.

Various changes and modification can be made without departing from the scope and spirit of the invention as described herein on the basis of a preferred embodiment. The appended claims are intended to cover any and all such changes and modifications within the scope and spirit of the invention.

It is claimed:

1. In a method of communicating between a central station and any mobile terminals of a plurality of mobile terminals, wherein communication occurs over a selected channel group of a plurality of channel groups, each such channel group having one TDM channel for forward channel transmissions directed from the central station toward any of the plurality of mobile terminals, and at least one return channel for TDMA return channel transmissions by any of the plurality of mobile terminals with a login request prior to login, and by logged in mobile terminals communicating with the central station, a method of balancing transmission loads among said channel groups comprising the steps of:

transmitting channel group load balancing information over the TDM channel of a first channel group of the plurality of channel groups for reception by a first category of mobile terminals of the plurality of mobile terminals which receive said channel group load balancing information by being tuned to the TDM channel of the first channel group in preparation for and prior to logging into said first channel group, and by a second category of mobile terminals of the plurality of mobile terminals which receive said channel load balancing information while being logged into said first channel group at the time of transmission of said channel group load balancing information;

interpreting said channel group load balancing information by one category of the first and second categories of mobile terminals receiving such channel group load balancing information;

based on an outcome of interpreting said channel group load balancing information, selecting a second channel group of the plurality of channel groups as a preferred channel group for use to effect load balancing the channel groups; and logging at least one of the mobile terminals having interpreted such channel group load balancing information into the second channel group.

2. The method of communicating according to claim 1, wherein the step of transmitting comprises:

transmitting channel group load balancing information over the TDM channel of the first channel group comprises periodically transmitting network management data including a channel group congestion factor for interpretation by mobile terminals of the first category of mobile terminals; and optionally transmitting, during periods of load imbalances among selected channel groups of the plurality of channel groups, a load balancing service packet containing a new TDM channel code, a mobile terminal selection randomizer code, and a randomizing interval code, said load balancing service packet to be interpreted by at least a subset of the second category of mobile terminals.

3. The method of communicating according to claim 2, wherein interpreting said channel group load balancing information comprises:

the first category of mobile terminals comparing the channel group congestion factor to a predetermined threshold value;

upon finding the channel group congestion factor of the first channel group to exceed the predetermined threshold value, said first category of mobile terminals tuning successively to TDM channels of other of the plurality of channel groups; and logging into a second channel group of the plurality of channel groups when a second channel group congestion factor, transmitted over the respective TDM channel such second channel group, is less than the threshold value, and logging into a primary assigned channel group when the respective channel group congestion factors of all TDM channels successively tuned to exceed the threshold value.

4. The method of communicating according to claim 2, wherein interpreting said channel group load balancing information comprises mobile terminals, of said subset of the second category of mobile terminals to interpret the load balancing service packet, generating a random move number and comparing the generated random move number to the mobile terminal selection randomizer code, and upon and after such comparison indicates that any such random move number is move-determining, by exceeding the mobile terminal selection randomizer code, the respective second category mobile terminal having generated such move-determining random move number logging into a second channel group specified by the new login channel code of the load balancing service packet.

5. The method of communicating according to claim 2, comprising, defining said subset of the second category of the mobile terminals to interpret the load balancing service packet by:

transmitting in such load balancing service packet a mobile terminal address field, such mobile terminal address field including a specific mobile terminal code, thereby defining a subset of one of the second category of the mobile terminals to interpret the load balancing service packet.

6. The method of communicating according to claim 2, comprising:

selecting the subset of the second category of the mobile terminals to include all of the second category mobile terminals.

7. The method of communicating according to claim 2, comprising:

selecting the subset of the second category of the mobile terminals to correspond to the mobile terminals of ail of the second category mobile terminals assigned to a designated customer.

8. The method of communicating according to claim 2, comprising:

transmitting information over any of the forward TDM channels of the plurality of channel groups formatted into frames of data fields of binary data, which data are transmitted at a predetermined data rate, the frames having a predetermined timed length corresponding to a timed frame period and containing a predetermined amount of data depending on the data rate; and interpreting said channel group load balancing information by mobile terminals of said subset of the second category of mobile terminals to interpret the load balancing service packet includes generating a random move number and comparing the generated random move number to the mobile terminal selection randomizer code, and upon and after such comparison indicates that any such random move number is move-determining, by exceeding the mobile terminal selection randomizer code, the method further comprising, the respective second category mobile terminal having generated such move-determining random move number generating a random move interval number, comparing the random move interval number to the randomizing interval code of the load balancing service packet to generate a random frame delay period, remaining in the first channel group for the length of the generated frame delay period, and then logging into the second channel group specified by the new TDM channel code.

9. The method of communicating according to claim 8, wherein generating a random frame delay period constitutes generating a random frame count starting with the frame in which the load balancing service packet is received to a maximum frame count specified by the randomizing interval code, subsequent to which such second category mobile terminal logs into the second channel group specified by the new login channel code.

* * * * *

UNITED STATES PATENT AND TRADEMARK OFFICE
CERTIFICATE OF CORRECTION

PATENT NO. : 5,898,681
DATED : April 27, 1999
INVENTOR(S): Santanu Dutta

It is certified that error appears in the above-identified patent and that said Letters Patent is hereby corrected as shown below:

On the title page, item [73], change "AMSE" to --AMSC--

Signed and Sealed this

Fourth Day of January, 2000

Attest:

Attesting Officer        *Acting Commissioner of Patents and Trademarks*